United States Patent
Ryu et al.

(10) Patent No.: US 7,791,859 B2
(45) Date of Patent: Sep. 7, 2010

(54) METHOD FOR MANUFACTURING DIELECTRIC CERAMIC POWDER, AND MULTILAYER CERAMIC CAPACITOR OBTAINED BY USING THE CERAMIC POWDER

(75) Inventors: Sung Soo Ryu, Seoul (KR); Seon Cheol Park, Kyungki-do (KR); Sang Pyo Lee, Kyungsangnam-do (KR); Dong Sook Sinn, Seoul (KR); Sang Kyun Lee, Kyungki-do (KR); Dang Hyok Yoon, Kyungki-do (KR)

(73) Assignee: Samsung Electro-Mechanics Co., Ltd., Suwon, Kyungki-do (KR)

( * ) Notice: Subject to any disclaimer, the term of this patent is extended or adjusted under 35 U.S.C. 154(b) by 0 days.

(21) Appl. No.: 12/340,041

(22) Filed: Dec. 19, 2008

(65) Prior Publication Data

US 2009/0103238 A1    Apr. 23, 2009

Related U.S. Application Data (62) Division of application No. 11/353,120, filed on Feb. 14, 2006.

(30) Foreign Application Priority Data

Mar. 29, 2005    (KR) .................. 10-2005-0025891

(51) Int. Cl.
  *H01G 4/06*    (2006.01)
  *C04B 35/00*    (2006.01)
(52) U.S. Cl. .................. 361/321.4; 361/321.5; 501/138
(58) Field of Classification Search ... 361/321.1–321.5, 361/311
  See application file for complete search history.

(56) References Cited

U.S. PATENT DOCUMENTS

| | | | |
|---|---|---|---|
| 4,448,665 | A | 5/1984 | Zaczepinski et al. |
| 4,612,600 | A | 9/1986 | Hodgkins |
| 4,764,493 | A | 8/1988 | Lilley et al. |
| 5,030,286 | A | 7/1991 | Crawford et al. |
| 5,356,868 | A | 10/1994 | Naito et al. |
| 5,783,165 | A | 7/1998 | Wilson et al. |

(Continued)

FOREIGN PATENT DOCUMENTS

EP    1 017 069 A2    7/2000

(Continued)

OTHER PUBLICATIONS

Japanese Patent Office, Office Action, issued Dec. 24, 2008.

(Continued)

*Primary Examiner*—Eric Thomas
(74) *Attorney, Agent, or Firm*—Lowe Hauptman Ham & Berner LLP (57) ABSTRACT

The invention relates to a method for manufacturing dielectric ceramic powder and a multilayer ceramic capacitor using the ceramic powder. According to the invention, $BaCO_3$ powder is dispersed into a solution of solvent and dispersant to prepare $BaCO_3$ slurry and then the resultant $BaCO_3$ slurry is wet-milled. Also, $TiO_2$ powder slurry is mixed into the wet-milled $BaCO_3$ slurry to form mixed slurry and then the mixed slurry is dried into mixed powder. Finally, the dried mixed powder is calcined to produce $BaTiO_3$ powder.

2 Claims, 9 Drawing Sheets

U.S. PATENT DOCUMENTS

| | | | |
|---|---|---|---|
| 6,545,857 | B2 | 4/2003 | Kishimoto et al. |
| 6,643,118 | B2 | 11/2003 | Nakamura et al. |
| 2001/0026865 | A1 | 10/2001 | Miyoshi |
| 2001/0036896 | A1 | 11/2001 | Wada et al. |
| 2002/0141139 | A1* | 10/2002 | Nakamura et al. ....... 361/321.2 |
| 2003/0012727 | A1 | 1/2003 | Yoshikawa et al. |
| 2006/0280675 | A1 | 12/2006 | Umeda et al. |

FOREIGN PATENT DOCUMENTS

| | | |
|---|---|---|
| EP | 1 130 004 A1 | 9/2001 |
| FR | 782 028 A | 5/1935 |
| JP | 62-134220 A | 6/1987 |
| JP | 62-297214 A | 12/1987 |
| JP | 07-025611 | 1/1995 |
| JP | 10-067566 | 3/1998 |
| JP | 10-338524 | 12/1998 |
| JP | 11-199318 | 7/1999 |
| JP | 2001-199765 | 7/2001 |
| JP | 2004-059372 A | 2/2004 |
| KR | 10-2002-53749 A | 7/2002 |
| KR | 10-2004-20252 A | 3/2004 |
| KR | 10-2004-38747 A | 5/2004 |
| WO | 03/100799 A | 12/2003 |

OTHER PUBLICATIONS (Industrial Material), vol. 39, No. 4, Seperate vol. of Mar. 1991, pp. 19, 49 and 50, and 52.

(Fragrance Journal), 1992, pp. 85-57.

(New Ceramic Powder Handbook), pp. 460-462, supervised by Katou Akio and Yamaguti Takashi, Science Forum, Jul. 25, 1983.

(New Keras3 Multilayer Ceramic Condenser), pp. 47-50, edited by New Keras Series Editing Committee, Gakuken Publishing, Sep. 26, 1988, First edition.

(Insulation and Induction Ceramics)-Manufacturing and Application pp. 211-215, supervised by Siozaka Tadashi, CMC, Aug. 25, 1985, First printing.

Japanese Patent Office Notice of Information Provision mailed Nov. 27, 2007 and English Translation.

(FC Report), vol. 9, No. 6, 1991, p. 236, left column, line 6, and Table 2 of p. 236.

Stojanovic B.D. et al., "Electrical Properties of Screen Printed BATI03 Thick Films", Journal of the European Ceramic Society, Elsevier Science Publishers, Barking, Essex, GB, vol. 24, No. 6, 2004, pp. 1467-1471.

Gavoglio M et al., "Influence of the C02 Back Flux on the Reaction Mechanisms of BATIO3 Formation From High TI02 Content in TI02-BAC03 Mixtures", Ceramics International, Elsevier, Amsterdam, NL, vol. 10, No. 4, Oct. 1984, pp. 132-134.

Fernandez J.F. et al., "Reaction Kinectics in the Barium Titanate (BATI03) Synthesis: Influence of the Titania Crystalline Structure and Morphology"., Materials Science Monographs, Elsevier Scientific Publishing, Amsterdam, NL, 1991, pp. 1973-1982.

European Search Report, mailed Nov. 8, 2006.

Chigira et al. "Colloid Chemical Mixing for Solid-State Synthesis of Barium Titanate" British Ceramic Proceedings, 61, 2000, 41-46.

US Office Action issued Dec. 26, 2008.

* cited by examiner

METHOD FOR MANUFACTURING DIELECTRIC CERAMIC POWDER, AND MULTILAYER CERAMIC CAPACITOR OBTAINED BY USING THE CERAMIC POWDER

RELATED APPLICATIONS

The present application is a division of U.S. application Ser. No. 11/353,120, filed Feb. 14, 2006, which is based on, and claims priority from Korean Patent Application No. 2005-25891 filed on Mar. 29, 2005, in the Korean Intellectual Property Office, the disclosures of which are incorporated herein by reference in their entirety.

CLAIM OF PRIORITY

This application claims the benefit of Korean Patent Application No. 2005-25891 filed on Mar. 29, 2005, in the Korean Intellectual Property Office, the disclosure of which is incorporated herein by reference.

BACKGROUND OF THE INVENTION

1. Field of the Invention

The present invention relates to a method for manufacturing dielectric ceramic powder. More particularly, the present invention relates to a method for manufacturing dielectric ceramic powder by using wet-milled $BaCO_3$ as raw powder to prepare raw ceramic powder via solid state reaction, thereby ensuring fine particle size and uniform particle size distribution, and a multilayer ceramic capacitor made from the ceramic powder.

2. Description of the Related Art

The information society of the 21st century has seen an increasing trend of digitalization, high-performance and high-reliability and multimedia in products such as electronic appliances, PC, HHP which chiefly utilize Multilayer Ceramic Capacitor (MLCC), one of the necessary passive devices of the electronics industry. Accordingly, MLCC parts have undergone higher-capacity and minimization fast. But this requires sheet lamination and fine $BaTiO_3$ particles having uniform size distribution as the dielectric power used. Also, tetragonality indicated by a c/a ratio of c-axis to a-axis of $BaTiO_3$ powder crystal needs to be higher (more than 1.008).

$BaTiO_3$ powder has been produced by hydrothermal synthesis, alkoxide method, solid state reaction and the like.

In hydrothermal synthesis, jel-type titanium hydrate is added to a great quantity of barium hydroxide to react at a high temperature of about 150° C. and under a high atmospheric pressure of 10, thereby producing crystalline $BaTiO_3$. This method has the advantage of directly producing spherical crystal $BaTiO_3$ sized about 100 nm but has the disadvantage of difficult design and maintenance of a reactor, and expensive manufacturing cost. Furthermore, recently, $BaTiO_3$ powder produced by hydrothermal synthesis has revealed significant defects such as oxygen vacancy and barium vacancy, which develop into pores in the case of heat treatment, thus deteriorating properties of $BaTiO_3$ powder.

Meanwhile in synthesizing $BaTiO_3$ via hydrolysis of metal alkoxide, metal alkoxide alcohol solution and Ba (OH) aqueous solution are mixed in a tube-type static mixer to react at a temperature of 80° C. This method is advantageous due to following reasons. Liquid phase employed herein as starting material is more reactive than solid jel-type titanium hydrate used in hydrothermal synthesis. This allows synthesizing at a relatively low temperature, and easy adjustment of the synthesized powder particle size to about 20 to 100 nm. However this method has drawbacks in that a synthesis device is hard to configure, and alkoxide reagent used as starting material is expensive. Furthermore, material cost is expensive due to use of alcohol solvent, and complicated process conditions such as synthesis temperature hamper mass productions.

Therefore, to manufacture low-priced $BaTiO_3$, solid state reaction is most advantageous. In solid state reaction, $BaCO_3$ powder and $TiO_2$ powder are used as starting powder. The $BaCO_3$ powder and $TiO_2$ powder are mixed, and then undergo solid phase reaction in a calcination process to be synthesized into final $BaTiO_3$ powder. To achieve lamination of dielectric layers, dielectric material powder should have small particle size and uniform particle distribution. But $BaTiO_3$ manufactured by solid state reaction reportedly does not exhibit uniform particle size distribution compared to BTO manufactured via other methods described above. In the end, in sold state reaction, one of essential factors for obtaining final uniform $BaTiO_3$ powder concerns uniform dispersion of $BaCO_3$ powder and $TiO_2$ powder in the early stage. Such technologies have been consistently developed.

For example, conventional technologies are disclosed in Korean Patent Application Publication Nos. 2002-0053749 and 2004-0038747. The Patent Application No. 2002-0053749 discloses barium titanate powder obtained by mixing barium compound and titanium dioxide having rutile ratio of up to 30% and BET specific surface area of at least 5 $m^2/g$ and calcining the same. Meanwhile, the Patent Application No. 2004-38747 teaches a technology of absorbing organic polymer compound into barium carbonate powder. According to inventions disclosed in the aforesaid patent application publications, advantageously, barium compound and titanium dioxide are mixed uniformly to enhance the degree of mixing. However despite dispersion of each element, the acicular shape of barium compounds remains unchanged, leading to inevitable contact among barium compounds due to their morphological properties. Consequently, there is a limit in obtaining optimal degree of mixing with titanium dioxide.

Another conventional technology is disclosed in Korean Patent Application Publication No. 2004-0020252. Herein, $BaCO_3$ powder is dry-milled spherically, mixed with $TiO_2$ powder, and then calcined. However according to the aforesaid technology, disadvantageously, such dry-milling does not reduce the number of $BaCO_3$ particles, and high stress placed on $BaCO_3$ does not disperse $BaCO_3$ particles properly, thus leading to agglomeration. Large specific surface area of powder, or small particle size results in uniform dispersion, but $BaCO_3$ according to the aforesaid technology does not diminish particle numbers, rendering uniform mixing with $TiO_2$ difficult. Thus, $BaTiO_3$ powder finally obtained agglomerates heavily among primary particles and forms secondary particles relatively bigger than primary particles, also causing uneven particle distribution of powder. $BaTiO_3$ powder with such properties may be hardly dispersible when applied to the MLCC, and unsuitable for the dielectric ceramic use for up to 1 μm lamination to ensure a high-capacity capacitor.

SUMMARY OF THE INVENTION

The present invention has been made to solve the foregoing problems of the prior art and it is therefore an object of the present invention to provide dielectric ceramic powder having fine particles and uniform particle size distribution, and high tetragonal crystallinity.

It is another object of the invention to provide a multilayer ceramic capacitor obtained by using the dielectric ceramic powder.

The invention will be explained hereunder.

As identified above, solid state reaction is the most economical method for producing $BaTiO_3$ powder having fine particles and uniform particle size, and high tetragonality to manufacture a high-capacity MLCC.

In solid state reaction, fine $BaTiO_3$ powder may be produced via $BaCO_3$ powder and $TiO_2$ powder having big specific surface area. But the acicular shape of $BaCO_3$ powder obstructs uniform mixing with $TiO_2$ powder even in the case of mechanical mixing via beads mill equipment, and renders it difficult to obtain uniform $BaTiO_3$ powder after final calcination. Further, despite uniform dispersion of fine $BaCO_3$ and $TiO_2$ powders, $BaCO_3$ power particles grow easily in the calcination process. Therefore the $BaCO_3$ powder particles grow even before reacting with $TiO_2$ and reaching a temperature at which $BaTiO_3$ particles are formed, thus making uniform reaction with $TiO_2$ difficult.

This increases unevenness of particles in case where fine $BaTiO_3$ powder is produced via solid state reaction to laminate dielectric layers.

Therefore, the inventors have conducted studies and experiments to solve problems of the solid state reaction. As a result, they confirmed that fine particles of $BaCO_3$ powder could be obtained effectively by wet-milling acicular-shaped $BaCO_3$ raw powder into a slurry and changing the particle shape from acicular to spherical. Also, the inventors found that fine $BaTiO_3$ powder with high tetragonality and uniform particle size distribution could be produced by mixing $TiO_2$ powder having a big specific surface area into such fine and spherical $BaCO_3$ slurry, drying and calcinating the mixed slurry.

According to an aspect of the invention for realizing the object, there is provided a method for manufacturing dielectric ceramic powder comprising steps of:

dispersing $BaCO_3$ powder into a solution of solvent and dispersant to prepare a slurry and then wet-milling the slurry;

mixing $TiO_2$ powder slurry into the wet-milled $BaCO_3$ slurry to form mixed slurry and then drying the mixed slurry into mixed powder; and calcining the dried mixed powder to produce $BaTiO_3$ powder.

According to another aspect of the invention for realizing the object, there is provided a method for manufacturing dielectric ceramic powder comprising steps of:

dispersing $BaCO_3$ powder into a solution of solvent and dispersant to prepare a slurry and then wet-milling the slurry;

mixing $CaCO_3$ powder slurry and $TiO_2$ powder slurry into the wet-milled $BaCO_3$ slurry to form mixed slurry, and then drying the mixed slurry; and calcining the dried mixed powder to produce $BaCaTiO_3$ powder.

According to further another aspect of the invention for realizing the object, there is provided a multilayer ceramic capacitor comprising:

a multilayer ceramic structure having a plurality of dielectric layers and a plurality of internal electrodes alternating with the dielectric layers; and external electrodes provided at both ends of the multilayer ceramic, electrically connected to at least one of the internal electrodes, wherein the dielectric layers comprise the dielectric ceramic powder manufactured according to the methods.

BRIEF DESCRIPTION OF THE DRAWINGS

The above and other objects, features and other advantages of the present invention will be more clearly understood from the following detailed description taken in conjunction with the accompanying drawings, in which:

FIG. 7a is FE-SEM picture illustrating morphology of $BaTiO_3$ powder manufactured according to a conventional solid state reaction;

FIG. 7b is a graph illustrating particle size distribution of $BaTiO_3$ powder of FIG. 7a;

FIG. 8a is FE-SEM picture illustrating an example of morphology of $BaTiO_3$ powder produced according to the invention;

FIG. 8b is a graph illustrating particle size distribution of $BaTiO_3$ powder of FIG. 8a;

FIG. 9a is FE-SEM picture illustrating another example of morphology of $BaTiO_3$ powder obtained according to the invention;

FIG. 9b is a graph illustrating particle size distribution of $BaTiO_3$ powder of FIG. 9a.

DETAILED DESCRIPTION OF THE PREFERRED EMBODIMENT

Preferred embodiments of the present invention will now be described in detail with reference to the accompanying drawings.

Figure 1:
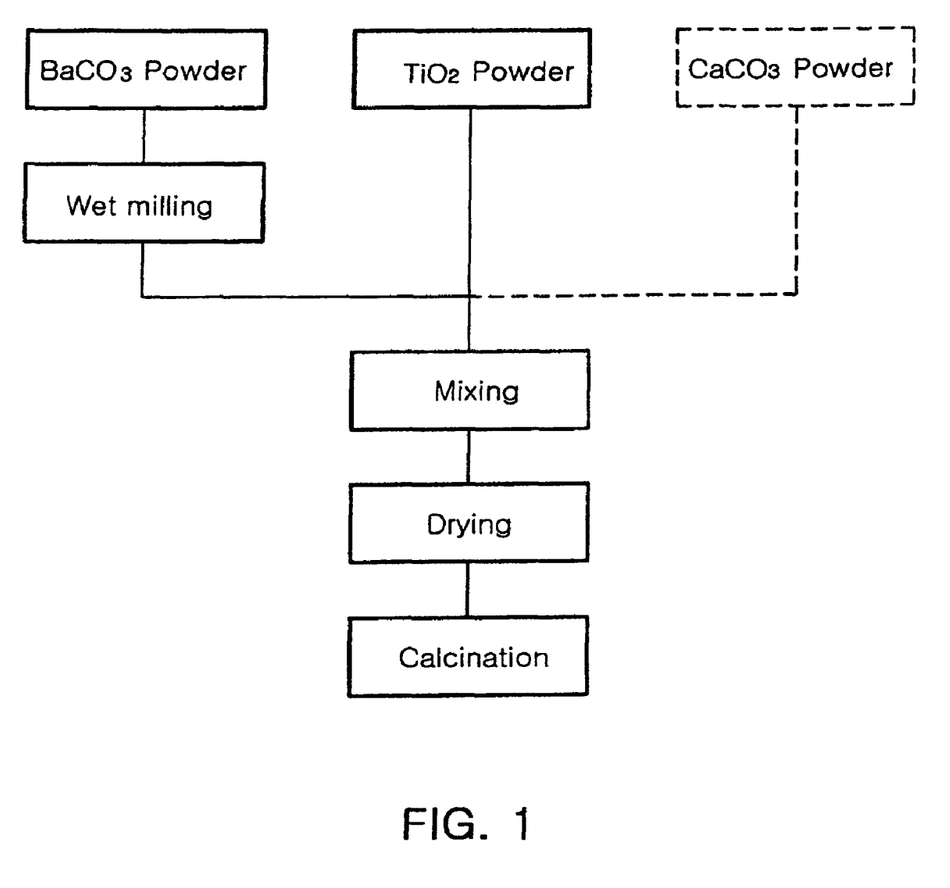
FIG. 1 illustrates a process for producing dielectric ceramic powder of the invention.

FIG. 1 illustrates a process for manufacturing dielectric ceramic powder of the invention. As shown in FIG. 1, according to the invention, first, $BaCO_3$ powder is dispersed into a solution of solvent and dispersant to prepare $BaCO_3$ slurry. The dispersant, e.g. polyacrylic dispersant, is added to increase dispersibility of powder. Preferably, the dispersant is added to 1-5 weight parts with respect to $BaCO_3$ raw powder. The $BaCO_3$ raw powder is acicular, and preferably should have a specific surface area of 5 to 30 $m^2/g$ by BET measurement.

Further, according to the invention, distilled water and alcohol may be used as the solvent, but distilled water is preferable.

More preferably, the $BaCO_3$ powder is dispersed into the solution to such an extent that that the $BaCO_3$ slurry contains 10 to 60 wt % $BaCO_3$. Less than 10 wt % $BaCO_3$ out of the $BaCO_3$ slurry adversely affects productivity (mass productivity). Also, $BaCO_3$ in excess of 60 wt % out of the $BaCO_3$ slurry degrades dispersibility and impairs wet milling.

Then, according to the invention, the $BaCO_3$ slurry is wet-milled. The wet-milling is carried out at a speed of 1800 rpm via beads mill type equipment that uses zirconia beads with a diameter of 0.3 mm. Preferably, the milling duration should be limited to up to 20 hours. More preferably, the $BaCO_3$ powder is wet-milled so as to have a specific surface area of at least 30 $m^2/g$ by BET measurement.

Figure 2:
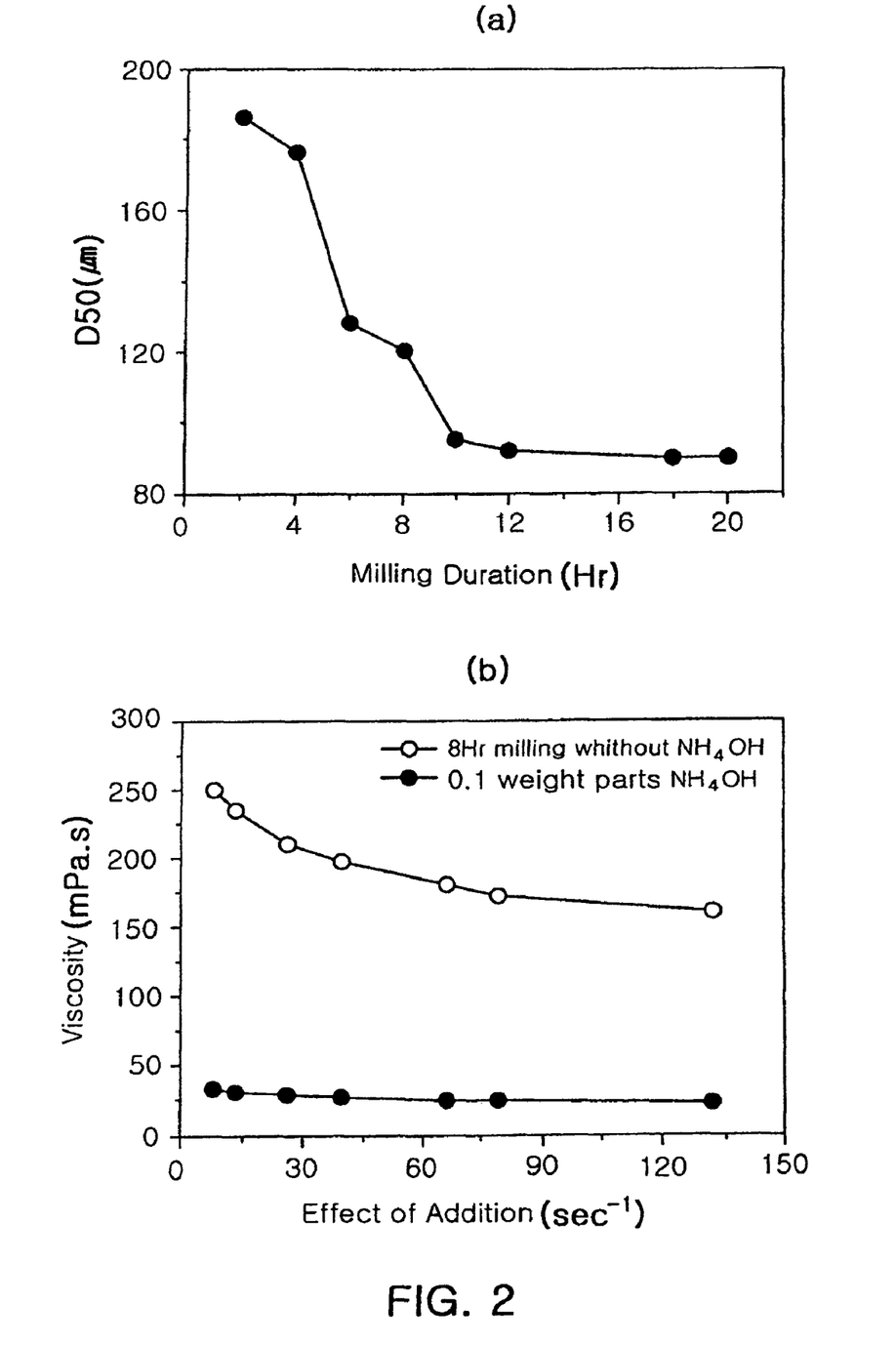
FIG. 2a is a graph illustrating particle size change in accordance with wet-milling duration of the invention.
FIG. 2b is a graph illustrating effects of ammonia addition on viscosity of $BaCO_3$ slurry in a wet-milling process of the invention.

With increase in milling time for $BaCO_3$ slurry, particle size of $BaCO_3$ powder decreases, leading to continuous increase in the specific surface area thereof. But as shown in FIG. 2(a), the specific surface area does not increase any more after 8 hours, increasing viscosity of slurry significantly. However, increased viscosity renders continuous wet-milling process difficult and thus it is necessary to reduce viscosity.

Therefore, according to the invention, to reduce viscosity of slurry, as shown in FIG. 2(b), ammonia should be preferably added in the wet-milling process. More preferably, the ammonia can be added to at least 0.1 wt % with respect to the solvent.

Then, according to the invention, $TiO_2$ powder slurry is mixed into the wet-milled $BaCO_3$ slurry to form mixed slurry. $TiO_2$ slurry can be easily manufactured by dispersing $TiO_2$ powder into a solution of solvent and dispersant. The $TiO_2$ raw powder preferably have a specific surface area of at least 20 $m^2/g$, and more preferably at least 45 $m^2/g$.

At this time, to produce $BaTiO_3$ powder in a following process, $TiO_2$ powder is mixed into a slurry to such an extent that a Ba/Ti mole ratio becomes 1. In this mixing process, the $BaCO_3$ slurry and $TiO_2$ slurry can be wet-mixed via zirconia beads with a diameter of 0.3 mm.

Meanwhile, sheet lamination of a high-capacity MLCC increases induced electric field, resultantly deteriorating IR and TCC properties. Therefore, to solve this problem, if necessary, $TiO_2$ slurry and $CaCO_3$ slurry as well may be mixed into the wet-milled $BaCO_3$ slurry. With such mixing of $CaCO_3$ slurry, Ca-doped $BaTiO_3$, or fine $BaCaTiO_3$ powder can be obtained in a following process.

Thereafter, the mixed slurry is dried to produce dried mixed powder, preferably, at a temperature of up to 200° C. The invention is not limited to the aforesaid drying method but spray drying method may be more preferable.

Also, if necessary, the dried powder may be coarsely crushed via atomizer.

And the dried mixed powder is calcined to synthesize dielectric ceramic powder such as $BaTiO_3$ powder or $BaCaTiO_3$ powder. In a calcination process, $BaCO_3$ powder and $TiO_2$ powder may undergo solid state reaction to form $BaTiO_3$ dielectric powder. Further, in case where $CaCO_3$ powder is additionally mixed, Ca-doped $BaCaTiO_3$ power can be obtained. Preferably, the calcination temperature ranges from 900 to 1100° C.

Powders synthesized in this fashion have necking among primary particles. To be used for the MLCC, typically, the mixed powders could go through a process of separation from primary particles undamaged. To this end, according to the invention, the synthesized ceramic powder can be pulverized. The pulverizing process can be carried out effectively through deagglomeration in beads mill.

Typical solid state reaction is applied to the dielectric ceramic powder manufactured according to the aforesaid process. Still the dielectric ceramic powder may have uniform particle size distribution, with mean particle size of 150 nm to 250 nm, D10/D50 of at least 0.6 and D90/D50 of up to 1.4. based on FE-SEM picture Also, the dielectric ceramic powder may have at least 5.0 $m_2/g$ of BET specific surface area, and based on FE-SEM picture, a c/a ratio of c-axis to a-axis of the powder crystal lattice is at least 1.009.

Meanwhile, organic binder, solvent and other additives may be mixed with the dielectric ceramic powder obtained to prepare ceramic slurry, and a dielectric layer for the MLCC, or green sheets may be manufactured by using the ceramic slurry via a general tape casting method. $Y_2O_3$, $Mn_3O_4$, $Cr_2O_3$ and glass are used as additives.

Figure 3:
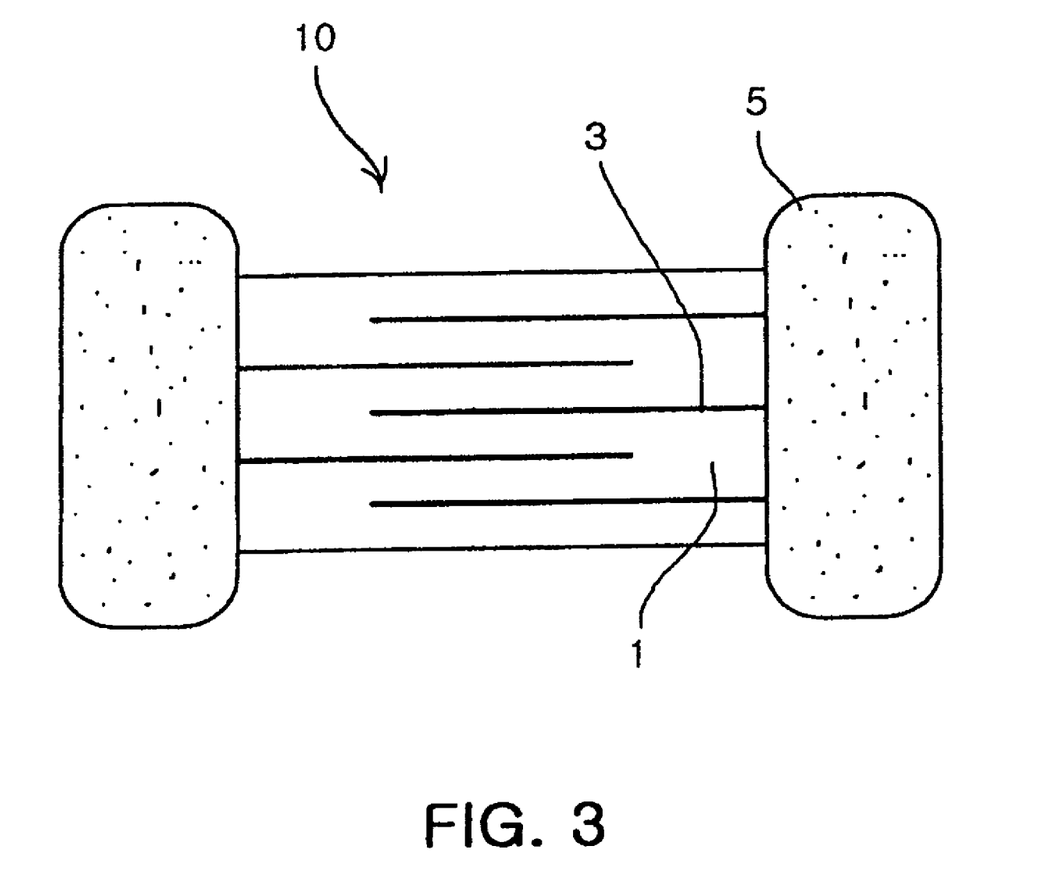
FIG. 3 is a sectional view illustrating a multilayer ceramic capacitor manufactured via the dielectric ceramic powder of the invention.

FIG. 3 is a sectional view illustrating a multilayer ceramic capacitor manufactured via the dielectric ceramic powder. As shown in FIG. 3, the multilayer ceramic capacitor (MLCC) 10 includes a multilayer ceramic structure having a plurality of dielectric layers 1 and a plurality of internal electrodes 3 alternating with the dielectric layers; and external electrodes 5 provided at both ends of the multilayer ceramic structure.

To manufacture the capacitor 10, first, ceramic slurry including the dielectric ceramic powder prepared as described above is used to form the dielectric layers 1 through the typical tape casting method. Then the internal electrodes 3 are formed on the dielectric layers 1 via screen printing. Subsequently firing is carried our for the multilayer ceramic structure including the unfired dielectric layers 1, and then applying a conductive paste on both ends of the multilayer ceramic structure and finally firing it, thereby producing the multilayer ceramic capacitor 10 having the external electrodes 5.

As described above, according to the invention, to uniformly disperse and mix $BaCO_3$ powder and $TiO_2$ powder, before mixing with $TiO_2$ powder, only acicular-shaped $BaCO_3$ powder is wet-milled to be made spherical. Spherical particle shape or significant reduction in particle size allows uniform mixing with $TiO_2$ Also, dielectric ceramic powder having fine particle size of 150 to 250 nm and high tetragonality can be manufactured by reacting $BaCO_3$ powder with $TiO_2$ powder before $BaCO_3$ powder particles grow in a calcination process.

Further, in case where the multilayer ceramic capacitor is manufactured via the dielectric ceramic powder produced by the aforesaid process, sheet lamination is ensured to effectively realize higher-capacity of the MLCC while reducing the size thereof.

The invention will be explained in detail with reference to the unlimited examples which follow.

Example 1

$BaCO_3$ raw powder having a specific surface area of 20 $m^2/g$ was prepared. Some of $BaCO_3$ raw powder was dispersed into a mixed solution of distilled water and polyacrylic dispersant to manufacture $BaCO_3$ slurry. $BaCO_3$ raw powder was dispersed into the solution to such an extent that the $BaCO_3$ slurry would contain 10 to 60 wt % $BaCO_3$ The slurry was wet-milled for 18 hours via beads mill type equipment that uses zirconia beads with a diameter of 0.3 mm as milling media. During wet-milling, considering a sudden increase in viscosity in accordance with decrease in $BaCO_3$ particle numbers, ammonia was added after 8 hour milling to reduce viscosity. A specific surface area of the wet-milled $BaCO_3$ powder was 31 $m^2/g$, a significant increase from the initial one, and the particles had almost a spherical shape.

Figure 4:
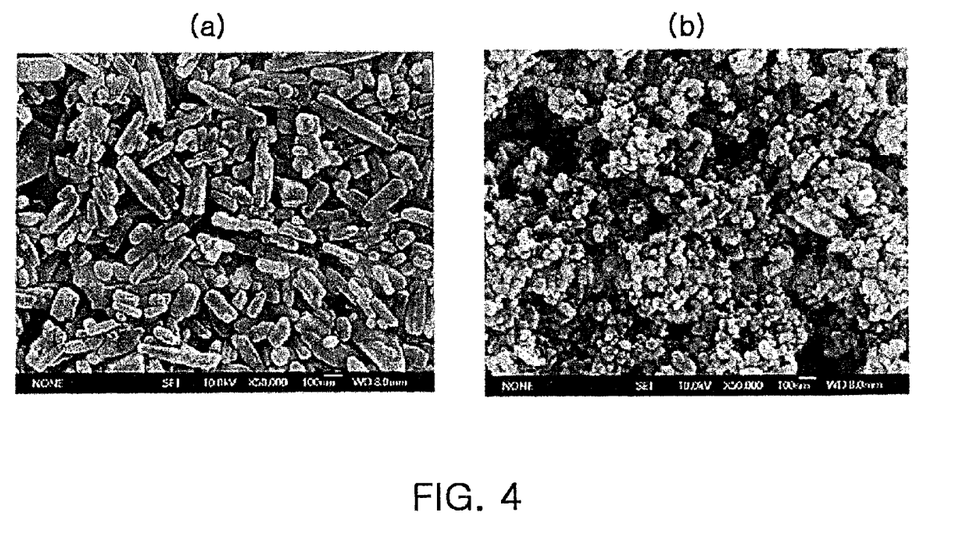
FIG. 4a is SEM picture of $BaCO_3$ powder before wet milling.
FIG. 4b is SEM picture of $BaCO_3$ powder wet-milled according to the invention.

Field Emission (FE-SEM) picture before and after wet-milling $BaCO_3$ is shown in FIG. 4(a-b). As shown in the aforesaid FIG. 4(a-b), wet-milling changed $BaCO_3$ from acicular powder into finer spherical powder.

Meanwhile, slurried $TiO_2$ powder having a specific surface area of 45 $m^2/g$ was mixed into the wet-milled $BaCO_3$ slurry, and then the mixed slurry was mixed via beads mill. At this time, mixed powder was slurried so that $BaTiO_3$ powder would have a Ba/Ti ratio of 1. Then for comparison, $BaCO_3$ raw powder, which was not wet-milled, was mixed with $TiO_2$ powder to produce mixed powder.

Figure 5:
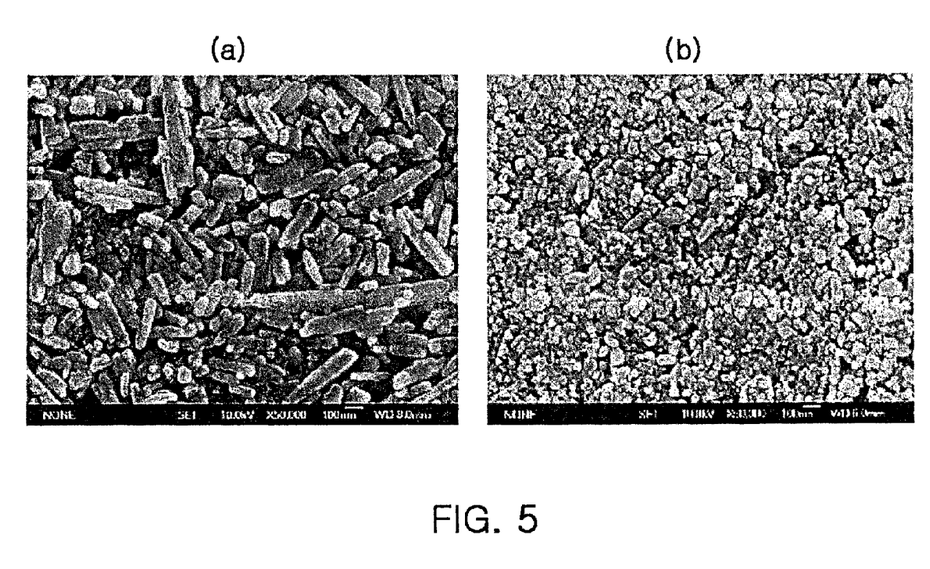
FIG. 5a is FE-SEM picture illustrating mixed powder of $BaCO_3$ powder and $TiO_2$ powder obtained without wet milling.
FIG. 5b is FE-SEM picture illustrating mixed powder of $BaCO_3$ powder wet-milled according to the invention and $TiO_2$ powder.

FIG. 5(a-b) shows FE-SEM picture of the final mixed powder. FIG. 5(a) is FE-SEM picture illustrating $BaCO_3$ powder mixed with $TiO_2$ powder without wet-milling, while FIG. 5(b) is FE-SEM picture of wet-milled $BaCO_3$ powder mixed with $TiO_2$ power. As shown in FIG. 5(a-b), when $BaCO_3$ powder without wet-milling was mixed with $TiO_2$ powder, it leads to uneven mixing but use of the wet-crushed $BaCO_3$ powder led to uniform mixing among each component.

Figure 6:
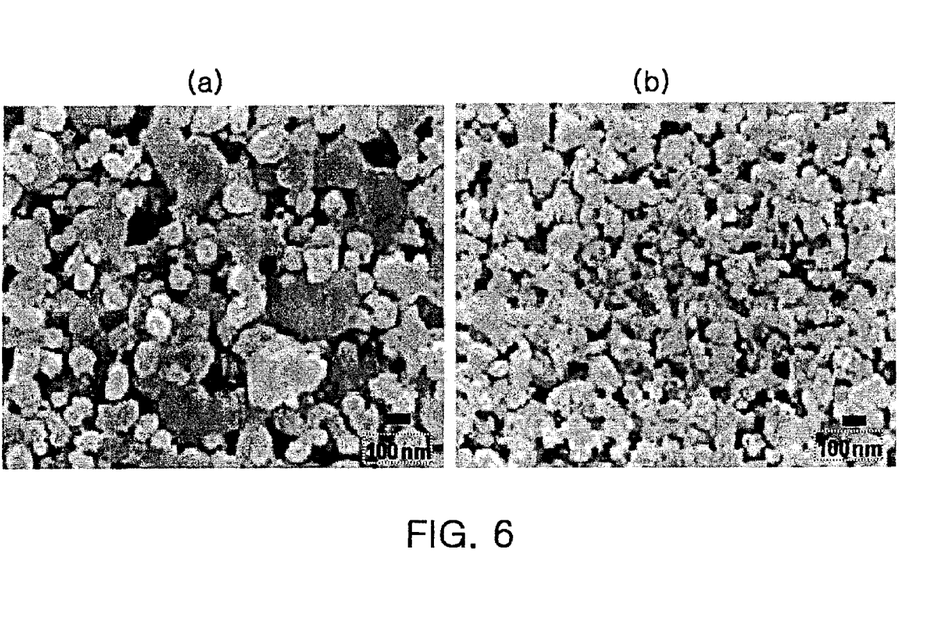
FIG. 6a is FE-SEM picture of the mixed powder of FIG. 5a which was heat-treated at a temperature of 900° C.
FIG. 6b is FE-SEM picture of the mixed powder of FIG. 5b which was heat-treated at a temperature of 900° C.

Also, to confirm whether $BaCO_3$ powder particles grow in case of rising temperature during a calcination process, mixed powders prepared as above were calcined and heat-treated at a temperature ranging from 600° C. to 1000° C. Consequently, as in FIG. 6(a), in case of using $BaCO_3$ powder without wet-milling, $BaCO_3$ particles grew considerably at a temperature of 900° C., while as in FIG. 6(b), in case where wet-milled $BaCO_3$ powder was used, particle growth was not observed, indicating that $BaTiO_3$ powder can be synthesized.

Example 2

TABLE 1

| No. | Wet-milling of $BaCO_3$ | Specific surface area ($m^2/g$) | | | Calcination temp. (° C.) |
|---|---|---|---|---|---|
| | | $BaCO_3$ | $TiO_2$ | $CaCO_3$ | |
| 1 | Not wet-milled | 20 | 20 | | 1020 |
| 2 | Not wet-milled | 20 | 20 | | 1040 |
| 3 | Wet-milled | 31 | 20 | | 1020 |
| 4 | Wet-milled | 31 | 20 | | 1040 |
| 5 | Wet-milled | 31 | 45 | | 960 |
| 6 | Wet-milled | 31 | 45 | | 990 |
| 7 | Wet-milled | 31 | 45 | | 1020 |
| 8 | Wet-milled | 31 | 45 | 30 | 960 |
| 9 | Wet-milled | 31 | 45 | 30 | 990 |

$BaCO_3$ raw powder having a specific surface area of 20 $m^2/g$ was prepared. Some of $BaCO_3$ raw powder was dispersed into a mixed solution of distilled water and polyacrylic dispersant to produce $BaCO_3$ slurry. $BaCO_3$ powder was dispersed into the solution to such an extent that $BaCO_3$ slurry would contain 10 to 60 wt % $BaCO_3$. The resultant slurry was wet milled for 18 hours via beads mill type equipment using zirconia beads with a diameter of 0.3 mm as milling media. Considering a sudden increase in viscosity in accordance with decrease in $BaCO_3$ particle numbers during a wet-milling process, ammonia was added to reduce viscosity after 8-hour milling. A specific surface area of the wet-milled $BaCO_3$ powder is shown in Table 1 above.

Slurried $TiO_2$ raw powder having different specific surface area was mixed into the wet-milled $BaCO_3$ slurry via beads mill. The mixed powder was slurried so that $BaTiO_3$ powder would have a Ba/Ti ratio of 1, and then the mixed powder was obtained by spray drying.

Meanwhile, in manufacturing Ca-doped $BaCaTiO_3$ dielectric ceramic powder, as shown in Table 1, slurried $TiO_2$ powder and slurried $CaCO_3$ powder having a specific surface area of 30 $m^2/g$ were mixed into the wet-milled $BaCO_3$. At this time, to obtain $(Ba_{0.98}Ca_{0.02})_{1.000}TiO_3$ powder, each of $TiO_2$ powder and $CaCO_3$ powder were mixed into a slurry form, and then dried by spraying dying to produce mixed powder.

For comparison, as shown in Table 1, some of $BaCO_3$ raw powder having a specific surface area of 20 $m^2/g$ was wet-mixed with $TiO_2$ powder having a specific surface area of 20 $m^2/g$ without undergoing wet-milling. The powders were measured and mixed so that resultant $BaTiO_3$ powder would have a Ba/Ti ratio of 1.

The resultant mixed powders were dried and calcined under the conditions set forth in Table 1 to manufacture $BaTiO_3$ or $BaCaTiO_3$ dielectric ceramic powder. Thereafter, the ceramic powder was deagglomerated via beads mill to produce final powder.

To examine properties of powders manufactured as above, BET specific surface area was measured. Also, through XRD analysis, a c/a ratio of c-axis to a-axis of the powder crystal lattice was calculated to measure tetragonality, and the results are shown in Table 2 below. Mean particle size ($D_{mean}$) of powder was measured via image analyzer based on FE-SEM picture. Further, to investigate uniformity of particle size distribution, measurement was conducted on 10% cumulative distribution D10, 50% cumulative distribution D50, and 90% cumulative distribution D90, respectively from small size distribution. The calculated results of D10/D50, D90/D50 are shown in Table 2.

TABLE 2

| Ceramic No. powder | SSA* ($m^2/g$) | MPS* (nm) | Particle size distribution | | Tetragonality |
|---|---|---|---|---|---|
| | | | D10/D50 | D90/D50 | |
| 1 $BaTiO_3$ | 5.66 | 176 | 0.41 | 1.57 | 1.0070 |
| 2 $BaTiO_3$ | 3.97 | 212 | 0.40 | 1.54 | 1.0097 |
| 3 $BaTiO_3$ | 4.58 | 199 | 0.62 | 1.38 | 1.0097 |
| 4 $BaTiO_3$ | 4.01 | 230 | 0.65 | 1.36 | 1.0103 |
| 5 $BaTiO_3$ | 5.68 | 150 | 0.70 | 1.26 | 1.0093 |
| 6 $BaTiO_3$ | 4.53 | 202 | 0.69 | 1.24 | 1.0105 |
| 7 $BaTiO_3$ | 4.08 | 218 | 0.72 | 1.24 | 1.0105 |
| 8 $BaCaTiO_3$ | 5.62 | 155 | 0.71 | 1.27 | 1.0091 |
| 9 $BaCaTiO_3$ | 4.57 | 198 | 0.70 | 1.24 | 1.0103 |

*SSA: Specific Surface Area
*MPS: Mean Particle Size

As shown in Tables 1 and 2, for sample 1 in which $BaCO_3$ was calcined at a temperature of 1020° C. without wet-milling, the particles were finely-sized with 176 nm but tetragonality thereof was 1.007, which is lower than 1.008 or a requirement for high-capacity dielectric powder. For sample 2 in which $BaCO_3$ was calcined at a temperature of 1040° C., $BaTiO_3$ having tetragonality of 1.0097 and size of about 212 nm was synthesized.

In contrast, for sample 3, in which $BaCO_3$ was wet-milled and then mixed with 20 $m^2/g$ of $TiO_2$, $BaCO_3$ particles were finely-sized with 199 nm and tetragonality thereof was 1.0097, a high figure even at a temperature of 1020° C., which is lower than when $BaCO_3$ was not wet-milled. Also, for sample 6 in which $BaCO_3$ was wet-milled and then mixed with $TiO_2$ powder having a specific area of 45 $m^2/g$, $BaTiO_3$ powder particles were sized 202 nm, with tetragonality of at least 1.010 at a temperature of 990° C. Further, for sample 5 in which $BaCO_3$ was calcined at a temperature of 960° C., $BaCO_3$ powder was obtained with fine particle size of 150 nm and big specific surface area of 5.68 $m^2/g$. Still, $BaTiO_3$ powder obtained had high tetragonality of 1.0093.

In addition, to compare particle uniformity based on cumulative particle size distribution, the calculated values of D10/

D50, D90/D50 were considered. Herein, bigger D10/D50 value and smaller D90/D50 value mean more uniform distribution. When the calculated values are compared, wet-milled $BaCO_3$ indicates bigger D10/D50 and smaller D90/D50, and thus more uniform particle size distribution than that without wet-milling. For mixed powders (samples 5 to 7) in which wet-milled $BaCO_3$ was mixed with $TiO_2$ having a specific surface area of 45 $m^2/g$, the particle size distributions were most uniform.

Further, Ca-added $BaCaTiO_3$ powder (samples 8 to 9) exhibited behavior similar to $BaTiO_3$ powder. By calcining at a temperature of 990° C. and 960° C., $BaCaTiO_3$ powders having mean particle size of 198 nm and 155 nm, respectively, could be produced with tetragonality of at least 1.0091 overall.

Figure 7:
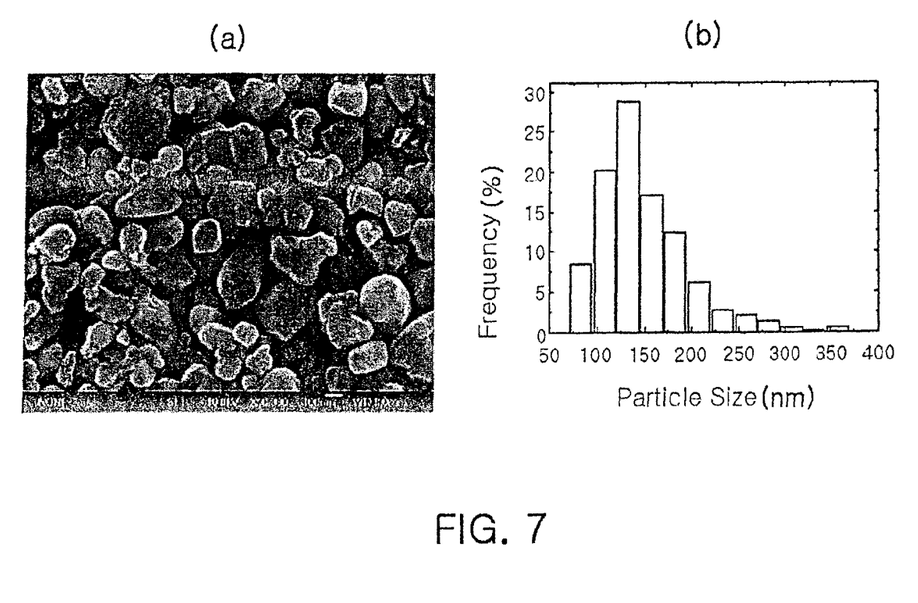
Figure 8:
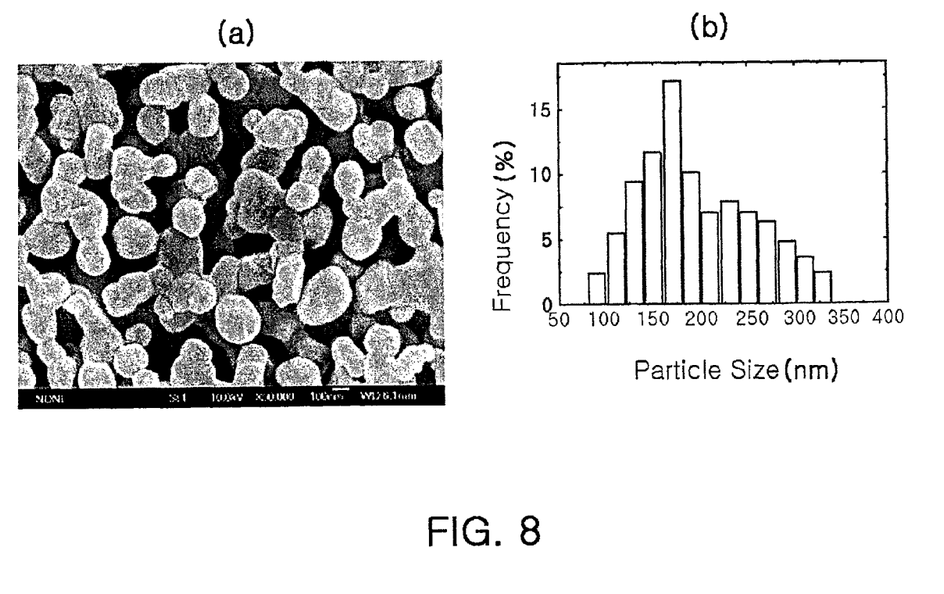
Figure 9:
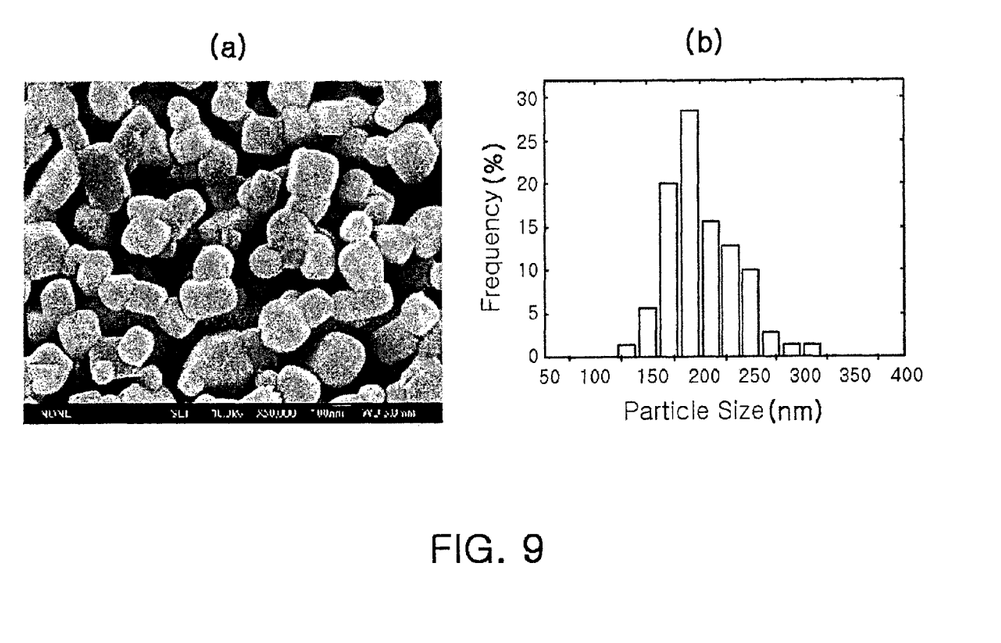

FIGS. 7a, 8a and 9a are FE-SEM pictures of dielectric ceramic powder corresponding to samples 2, 3 and 6. FIGS. 7b, 8b and 9b are graphs illustrating particle size distribution measured via image analyzer. As shown in the above FIGS. 7a, 7b, 8b and 9b, compared to sample 2 which used $BaCO_3$ without wet-milling, sample 3 which used wet-milled $BaCO_3$ powder indicated more uniform particle size distribution. Further, the narrowest particle size distribution was found in sample 6 which used wet-milled $BaCO_3$ powder and $TiO_2$ powder having big specific surface area.

As set forth above, according to the invention, $BaTiO_3$ or $BaCaTiO_3$ is manufactured via wet-milled $BaCO_3$ powder to produce uniform dielectric ceramic powder having fine particles sized 150 to 250 nm and high tetragonality.

Also, the multilayer ceramic capacitor manufactured via dielectric ceramic powder allows sheet lamination and enables higher-capacity and minimization of the MLCC.

While the present invention has been shown and described in connection with the preferred embodiments, it will be apparent to those skilled in the art that modifications and variations can be made without departing from the spirit and scope of the invention as defined by the appended claims.

What is claimed is:

1. A multilayer ceramic capacitor comprising:
   a multilayer ceramic structure having a plurality of dielectric layers and a plurality of internal electrodes alternating with the dielectric layers; and
   external electrodes provided at both ends of the multilayer ceramic, electrically connected to at least one of the internal electrodes,
   wherein the dielectric layers comprise the dielectric ceramic powder manufactured by dispersing $BaCO_3$ powder having an acicular shape into a solution of solvent and dispersant to prepare a slurry and then wet-milling the slurry to change the acicular shape of the $BaCO_3$ powder for a spherical shape;
   mixing $TiO_2$ powder slurry into the wet-milled $BaCO_3$ slurry to form mixed slurry and then drying the mixed slurry into mixed powder; and
   calcining the dried mixed powder to produce $BaTiO_3$ powder;
   wherein $BaTiO_3$ power has uniform particle size distribution, with mean particle size of 150 nm to 250 nm, D10/D50 of at least 0.6 and D90/D50 of up to 1.4 based on FE-SEM picture and at least 5.0 m2/g of BET specific surface area, and based on FE-SEM picture, a c/a ratio of c-axis to a-axis of the powder crystal lattice is at least 1.009.

2. A multilayer ceramic capacitor comprising:
   a multilayer ceramic structure having a plurality of dielectric layers and a plurality of internal electrodes alternating with the dielectric layers; and
   external electrodes provided at both ends of the multilayer ceramic and electrically connected to at least one of the internal electrodes,
   wherein the plurality of dielectric layers comprises a dielectric ceramic powder manufactured by dispersing $BaCO_3$ powder having an acicular shape into a solution of solvent and dispersant to prepare a slurry and then wet-milling the slurry to change the shape of the $BaCO_3$ powder from a acicular shape to a spherical shape;
   mixing $CaCO_3$ powder slurry and $TiO_2$ powder slurry into the wet-milled $BaCO_3$ slurry to form mixed slurry and then drying the mixed slurry into mixed powder; and
   calcining the dried mixed powder to produce $BaCaTiO_3$ powder;
   wherein $BaCaTiO_3$ power has uniform particle size distribution, with mean particle size of 150 nm to 250 nm, D10/D50 of at least 0.6 and D90/D50 of up to 1.4 based on FE-SEM picture and at least 5.0 m2/g of BET specific surface area, and based on FE-SEM picture, a c/a ratio of c-axis to a-axis of the powder crystal lattice is at least 1.009.

* * * * *